(12) United States Patent
Demir et al.

(10) Patent No.: US 7,248,649 B2
(45) Date of Patent: Jul. 24, 2007

(54) DIGITAL BASEBAND RECEIVER INCLUDING A TIME DOMAIN COMPENSATION MODULE FOR SUPPRESSING GROUP DELAY VARIATION DISTORTION INCURRED DUE TO ANALOG LOW PASS FILTER DEFICIENCIES

(75) Inventors: Alpaslan Demir, Commack, NY (US); Leonid Kazakevich, Plainview, NY (US); Tanbir Haque, Long Island City, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 753 days.

(21) Appl. No.: 10/749,634

(22) Filed: Dec. 31, 2003

(65) Prior Publication Data

US 2006/0133546 A1    Jun. 22, 2006

Related U.S. Application Data

(60) Provisional application No. 60/482,832, filed on Jun. 25, 2003.

(51) Int. Cl.
*H03D 3/00*   (2006.01)
*H03K 9/06*   (2006.01)

(52) U.S. Cl. ............... 375/322; 375/316; 329/315; 329/345

(58) Field of Classification Search ............... 375/316, 375/322; 329/315, 345
See application file for complete search history.

(56) References Cited

U.S. PATENT DOCUMENTS

| | | | | |
|---|---|---|---|---|
| 4,710,772 | A | * | 12/1987 | Cantwell et al. ............ 342/92 |
| 5,124,705 | A | * | 6/1992 | Voorman ................ 341/143 |
| 5,539,773 | A | * | 7/1996 | Knee et al. ............. 375/232 |
| 6,593,806 | B1 | * | 7/2003 | Melanson ............... 330/10 |
| 6,621,880 | B1 | * | 9/2003 | Niesen ................. 375/340 |
| 7,103,029 | B1 | * | 9/2006 | Minowa ................ 370/342 |
| 2003/0206603 | A1 | * | 11/2003 | Husted ................. 375/324 |
| 2004/0146120 | A1 | * | 7/2004 | Brown .................. 375/322 |

* cited by examiner

*Primary Examiner*—David C. Payne
*Assistant Examiner*—Erin M. File
(74) *Attorney, Agent, or Firm*—Volpe and Koenig, P.C.

(57) ABSTRACT

A digital baseband (DBB) radio frequency (RF) receiver used for receiving and processing a wireless communication signal. The DBB receiver includes a demodulator, first and second analog low pass filters (LPFs), first and second digital gain control circuits, and a digital time domain compensation module which removes group delay variation distortion, introduced by the first and second analog LPFs, from real and imaginary signal components of the communication signal.

24 Claims, 3 Drawing Sheets

DIGITAL BASEBAND RECEIVER INCLUDING A TIME DOMAIN COMPENSATION MODULE FOR SUPPRESSING GROUP DELAY VARIATION DISTORTION INCURRED DUE TO ANALOG LOW PASS FILTER DEFICIENCIES

CROSS REFERENCE TO RELATED APPLICATION

This application claims priority from U.S. Provisional Patent Application Ser. No. 60/482,832, filed Jun. 25, 2003, which is incorporated by reference as if fully set forth herein.

FIELD OF THE INVENTION

The present invention generally relates to receiver design in wireless communication systems. More particularly, the present invention relates to digital signal processing (DSP) techniques used to compensate for group delay variation distortion introduced in an analog radio receiver.

BACKGROUND

Existing wireless system architectural configurations impose stringent constraints on the system designer with regards to receiving communication signals. Moreover, such configurations often provide low reliability communication links, high operating costs, and an undesirably low level of integration with other system components.

As shown in FIG. 1, a conventional RF receiver 100 includes an analog radio receiver 105, at least one analog to digital converter (ADC) 110, a controller 115 and a modem 120. The analog radio receiver 105 is a direct conversion (DC) receiver which includes an antenna 125 for receiving a wireless communication signal, a bandpass filter 130, a low noise amplifier (LNA) 135, an optional second filter 140 (e.g., bandpass filter), a demodulator 145 having two outputs 150, 155, a phase-locked loop (PLL) 160 and first and second analog low pass filters (LPFs) 165, 170 for controlling bandwidth selectivity.

The modem 120 controls the switching of the LNA 135. The PLL 160 generates a local oscillator (LO) signal to control the two outputs 150, 155 of the demodulator 145. The output 150 is an in-phase (I) output of the demodulator 145 for outputting a real signal component of the wireless communication signal. The output 155 is a quadrature (Q) output of the demodulator 145 for outputting an imaginary signal component of the wireless communication signal.

In the conventional RF receiver 100 of FIG. 1, the ADC 110 is connected to the real and imaginary signal outputs 150, 155, via the analog LPFs 165, 170, respectively. An analog real signal component 175 is output from the LPF 165 to a real input port of the ADC 110 and an analog imaginary signal component 180 is output from LPF 170 to an imaginary input port of the ADC 110. The ADC 110 outputs digital real and imaginary signal outputs 185, 190. The controller 115 maintains control over all of the active components of analog radio receiver 105 and the ADC 110.

In the analog radio receiver 105, the analog LPFs 165, 170, are utilized to guarantee the spectral shape of the wireless communication signal received via the antenna 125 before being sampled at the ADC 110. Typically, the specifications (e.g., error vector magnitude) on the analog LPFs 165, 170, are very stringent such that the implementation requires high order filtering. Implementing high order filter designs for the analog LPFs 165, 170, may be complicated and expensive. Thus, the tolerances on parts for the analog LPFs 165, 170 may lead to unacceptable production yield. Reducing the design complexity of the analog LPFs 165, 170, may be accomplished with a lower order filter design with less stringent specifications. However, using such a filter design in the analog LPFs 165, 170, will result in the occurrence of a group delay variation distortion if no compensation is introduced after the analog LPFs 165, 170.

Because the costs of LPFs that process RF analog signals are higher than the components that use DSP, it is desired to provide a digital baseband (DBB) system, including a low cost receiver with low noise and minimal power requirements, which utilizes DSP techniques to compensate for group delay variation distortion caused by analog LPFs.

SUMMARY

The present invention is a DBB transmitter for receiving and processing a wireless communication signal. The DBB receiver includes a demodulator, first and second analog LPFs, first and second digital gain control circuits, and a digital time domain compensation module which removes group delay variation distortion, introduced by the first and second analog LPFs, from real and imaginary signal components of the communication signal.

The present invention may be incorporated into a DBB transmitter, a wireless transmit/receive unit (WTRU), an integrated circuit (IC), a wireless communication system and method, or any other desired communication mechanism.

The demodulator outputs analog real and imaginary signal components in response to receiving the communication signal. The first analog low pass filter (LPF) receives the analog real signal component from the demodulator and outputs a distorted analog real signal component. The second analog LPF receives the analog imaginary signal component from the demodulator and outputs a distorted analog imaginary signal component. The first digital gain control circuit receives the distorted analog real signal component from the first analog LPF and outputs a processed distorted digital real signal component. The second digital gain control circuit receives the distorted analog imaginary signal component from the second analog LPF and outputs a processed distorted digital imaginary signal component. The digital time domain compensation module receives the processed distorted digital real and imaginary signal components and outputs digital real and imaginary compensated signal components.

The digital time domain compensation module may include a real signal path, a plurality of real signal component delay units connected in series along the real signal path, a plurality of real filter coefficient positions, a first combiner having a plurality of inputs, and a plurality of active real filter coefficient units located at a subset of the real filter coefficient positions. Each of the active real filter coefficient units may have an input connected to the real signal path and an output connected to one of the inputs of the first combiner. The first combiner may output the real compensated signal component.

The digital time domain compensation module may further include an imaginary signal path, a plurality of imaginary signal component delay units connected in series along the imaginary signal path, a plurality of imaginary filter coefficient positions, a second combiner having a plurality of inputs, and a plurality of active imaginary filter coefficient units located at a subset of the imaginary filter coefficient positions. Each of the active imaginary filter coefficient units may have an input connected to the imaginary signal path and an output connected to one of the inputs of the second combiner. Thee second combiner may output the imaginary compensated signal component.

The digital time domain compensation module may includes a plurality of real filter coefficient unit positions and a plurality of imaginary filter coefficient unit positions. A plurality of active real filter coefficient units may be present at a subset of the real filter coefficient unit positions and a plurality of active imaginary filter coefficient units may be present at a subset of the imaginary filter coefficient unit positions.

The digital time domain compensation module may further include a plurality of real signal component delay units and a plurality of imaginary signal component delay units having inputs and outputs connected to the inputs of respective ones of the active filter coefficient units.

The digital time domain compensation module may be a finite impulse response (FIR) filter having characteristics which are selected such that the frequency domain response of the digital time domain compensation module is the inverse of the frequency domain response of the analog LPFs.

The first digital gain control circuit may include a logarithmic amplifier, an analog to digital converter (ADC), and a look up table (LUT). The logarithmic amplifier may compress the distorted analog real signal component from a wider dynamic range to a lower dynamic range. The ADC may convert the compressed distorted analog real signal component to a compressed distorted digital real signal component. The LUT may provide an anti-log function used to decompress the compressed distorted digital real signal component.

The second digital gain control circuit may include a logarithmic amplifier, an ADC, and an LUT. The logarithmic amplifier may compress the distorted analog imaginary signal component from a wider dynamic range to a lower dynamic range. The ADC may convert the compressed distorted analog imaginary signal component to a compressed distorted digital real signal component. The LUT may provide an anti-log function used to decompress the compressed distorted digital imaginary signal component.

BRIEF DESCRIPTION OF THE DRAWING(S)

A more detailed understanding of the invention may be had from the following description of a preferred example, given by way of example and to be understood in conjunction with the accompanying drawing wherein.

DETAILED DESCRIPTION OF THE PREFERRED EMBODIMENTS

Figure 1:
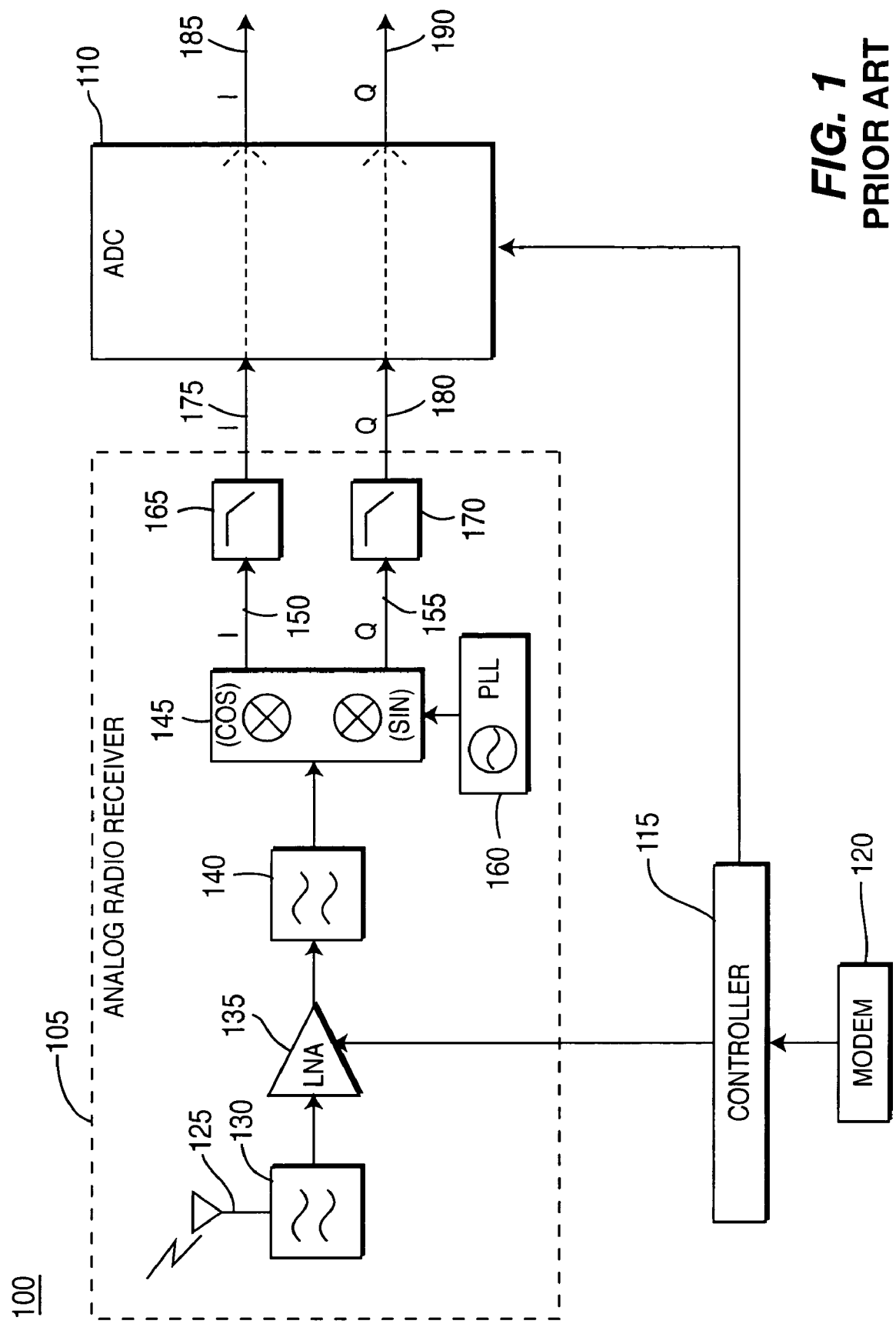
FIG. 1 is a block diagram of a conventional RF receiver including an analog radio receiver.
Figure 2:
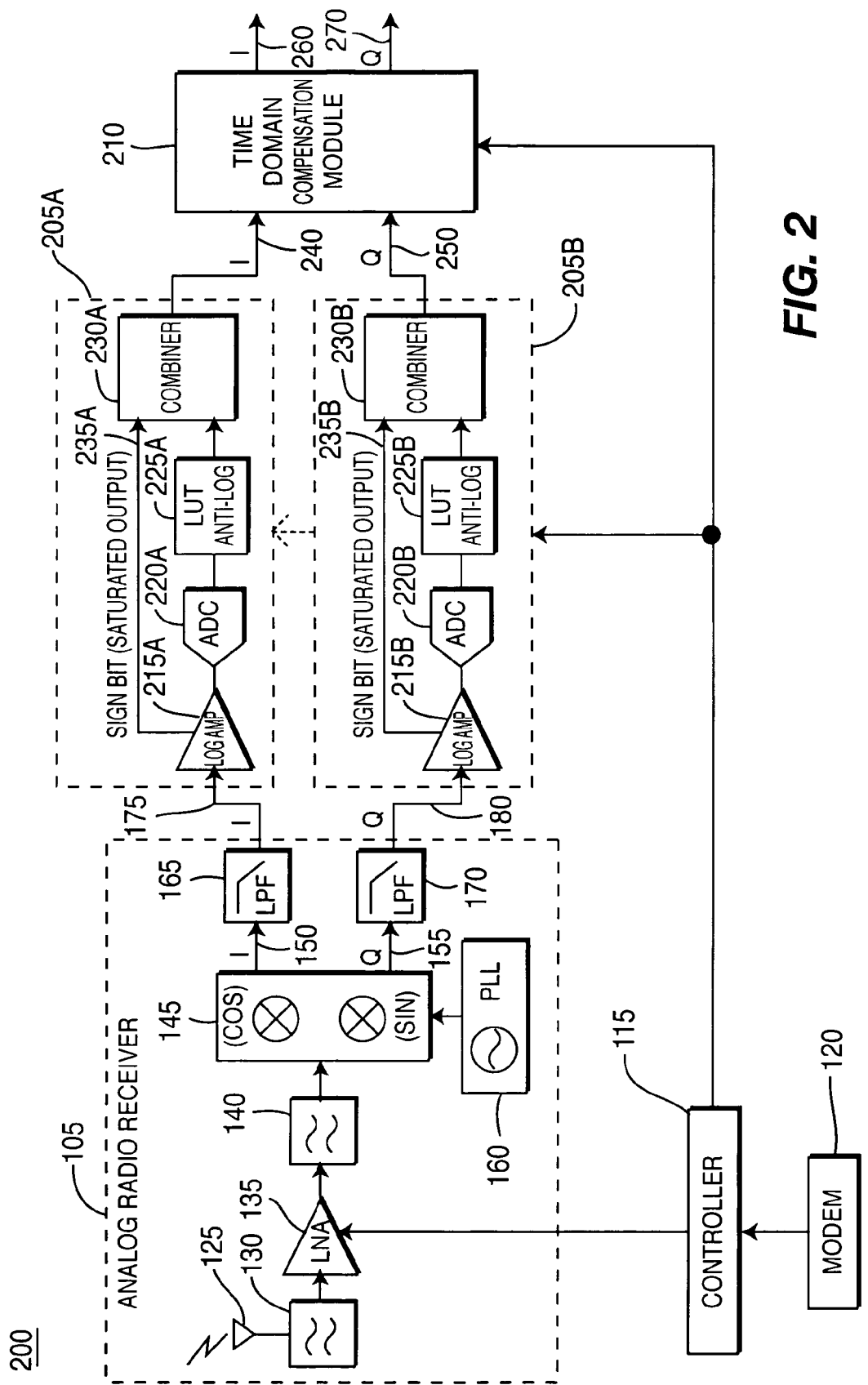
FIG. 2 is a block diagram of a DBB RF receiver configured in accordance with a preferred embodiment of the present invention.

FIG. 2 is a block diagram of a DBB RF receiver 200, configured in accordance with a preferred embodiment of the present invention. Although the invention will be referred to in terms of being implemented upon a receiver 200, it should also be understood by those of skill in the art that the invention pertains equally to a transceiver.

Preferably, the method and system disclosed herein is incorporated into a wireless transmit/receive unit (WTRU). Hereafter, a WTRU includes but is not limited to a user equipment, mobile station, fixed or mobile subscriber unit, pager, or any other type of device capable of operating in a wireless environment. The features of the present invention may be incorporated into an integrated circuit (IC) or be configured in a circuit comprising a multitude of interconnecting components.

The present invention is applicable to communication systems using time division duplex (TDD), time division multiple access (TDMA), frequency division duplex (FDD), code division multiple access (CDMA), CDMA 2000, time division synchronous CDMA (TDSCDMA), and orthogonal frequency division multiplexing (OFDM). However, the present invention is envisaged to be applicable to other types of communication systems as well.

As shown in FIG. 2, the DBB RF receiver 200 includes an analog radio receiver 105, a real signal path digital gain control circuit 205A, an imaginary signal path digital gain control circuit 205B, and a digital time domain compensation module 210. The digital time domain compensation module 210 has a real signal input 240 connected to the analog real signal component 175 via the real signal path digital gain control circuit 205A. The digital time domain compensation module 210 also has an imaginary signal input 250 connected to the analog imaginary signal component 180 via the imaginary signal path digital gain control circuit 205B. The digital time domain compensation module 210 further includes real and imaginary compensated signal outputs 260, 270. The digital time domain compensation module 210 and the digital gain control circuits 205A, 205B, may be controlled by the controller 115.

Still referring to FIG. 2, each of digital gain control circuits 205A, 205B, include a logarithmic amplifier 215A, 215B, or other amplifier with known compression characteristics for compressing the input analog signals received from analog radio receiver 105 from a wider dynamic range to a lower dynamic range. In other words, the logarithmic amplifiers 215A, 215B, apply a particular level of amplification to the analog real (I) and imaginary (Q) signal components 175, 180, in accordance with their amplitude. Each of the digital gain control circuits 205A, 205B, further includes an ADC 220A, 220B, a look up table (LUT) 225A, 225B, and a combiner 230A, 230B. The LUTs 225A, 225B, provide an anti-log function used to decompress the converted digital signals based on previously captured compression curve data. The ADCs 220A, 220B, digitize the outputs of logarithmic amplifiers 215A, 215B, and provide the digitized outputs to the LUTs or anti-log functions 225A, 225B, in order to decipher the digital domain of the analog real and imaginary signal components 175, 180. The outputs of the ADCs 220A, 220B, are converted to a linear scale by generating (2*n-1) bit signals. It may be necessary to add one or more additional gain stages before each logarithmic amplifier 215A, 215B, if the existing gain is not sufficient to promote saturation. The combiners 230A, 230B, combine the digitized outputs of the LUTs 225A, 225B, with sign bits 235A, 235B, provided by saturated outputs of the logarithmic amplifiers 215A, 215B, to generate a digital real signal component 240 and a digital imaginary signal component 250. The sign bits 235A, 235B, are created from saturated outputs of logarithmic amplifiers 215A, 215B, respectively.

The digital gain control circuits 205A, 205B, are used to compensate for channel loss variation and to support a large dynamic range of incoming signals (e.g., from 100 dBm to −20 dBm). The digital gain control circuits 205A, 205B, are also used to minimize the number of bits required for operating the ADCs 220A, 220B, and are designed to efficiently compensate for channel loss variation in an expeditious manner, without distorting the signal envelope. The digital gain control circuits 205A, 205B, have a linear response, in dB-per-volt. In a closed loop system, the digital gain control circuits 205A, 205B, are used to maintain functions such as stability, settling time, overshoot, etc.

Figure 3:
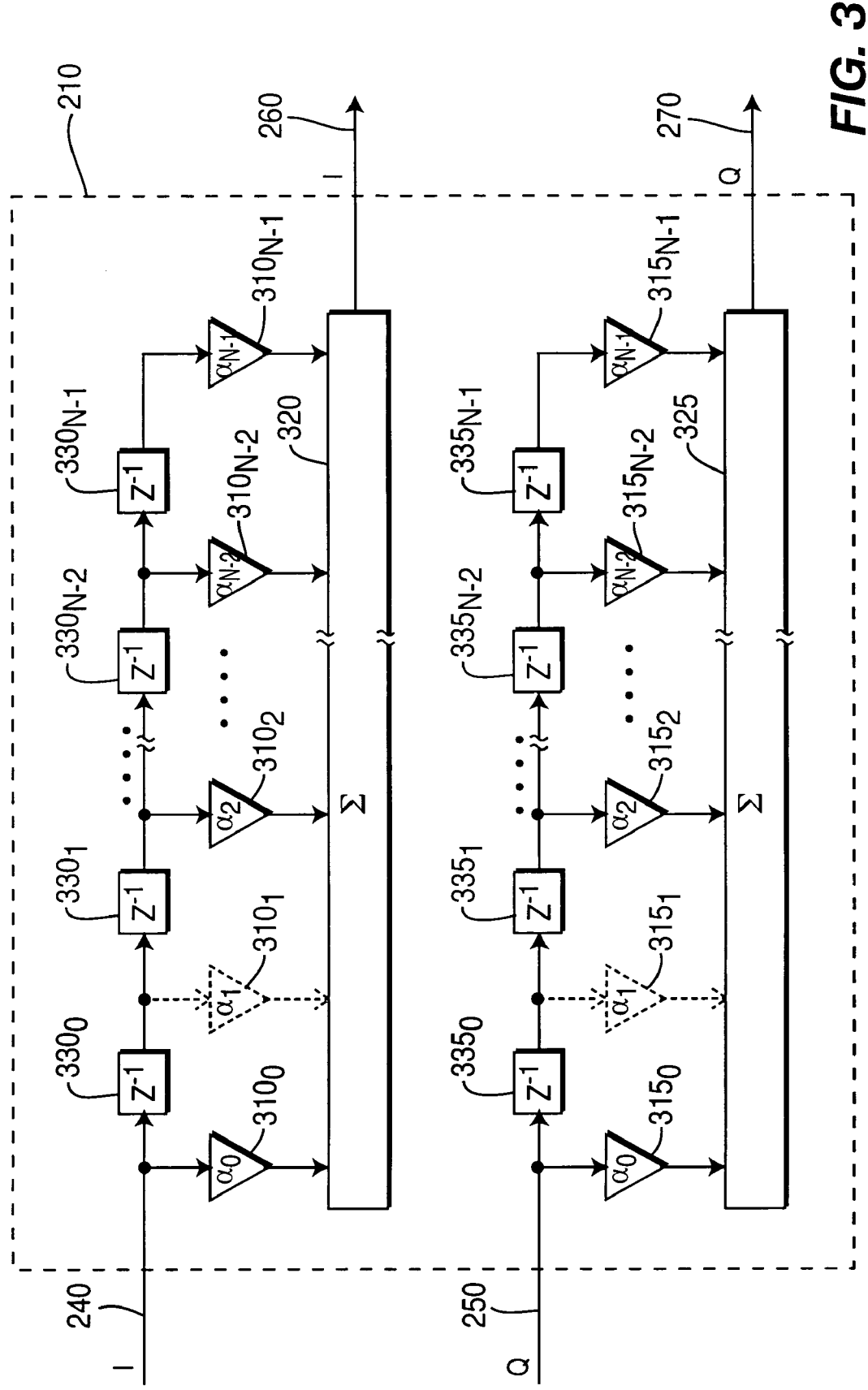
FIG. 3 shows an exemplary configuration of the digital time domain compensation module in the DBB RF receiver of FIG. 2.

FIG. 3 shows an exemplary configuration of the digital time domain compensation module 210 in the DBB RF receiver 200. The digital time domain compensation module 210 is used to suppress the distortion introduced by the analog LPFs 165, 170, on the real and imaginary analog outputs 150, 155, of the demodulator 145. The digital time domain compensation module 210 may be a digital finite impulse response filter (FIR) having characteristics which are selected such that the frequency domain response of the digital time domain compensation module 210 is the inverse of the frequency domain response of the analog LPFs 165, 170, in the analog radio receiver 105. When the frequency response of the digital time domain compensation module 210 is convolved with the frequency response of the analog LPFs 165, 170, the distortion caused by the analog LPFs 165, 170, is suppressed.

The real and imaginary signal paths of the digital time domain compensation module 210 have the same frequency characteristics for removing the distortion which occurs on each of the real and imaginary signal paths due to the group delay variation caused by the analog LPFs 165, 170. Thus, the real and imaginary compensated signals output by real and imaginary compensated signal outputs 260, 270, of the time domain compensation module 210 do not include the distortion.

FIG. 3 shows a plurality of successively connected real delay (i.e., weighting) units $330_0, 330_1, \ldots, 330_{N-2}, 330_{N-1}$, are connected in series along the real signal path of the digital time domain compensation module 210 to apply respective delays to a plurality of real filter coefficient unit positions (i.e., tabs) $310_0, 310_1, 310_2, \ldots, 310_{N-2}, 310_{N-1}$. For example, a first active real filter coefficient unit located at the real filter coefficient unit position $310_0$ has an input connected to the input of a first real delay unit $330_0$. A second real filter coefficient unit position $310_1$ is located between the output of the first real delay unit $330_0$ and the input of a second real delay unit $330_1$. As shown in FIG. 3, a real filter coefficient unit is not active (i.e., it is passive) at the second real filter coefficient unit position $310_1$. Thus, the second real filter coefficient unit position $310_1$ does not contribute to the compensation characteristics of the time domain compensation module 210 (i.e., its output is zero).

A second active real filter coefficient unit located at the third real filter coefficient unit position $310_2$ has an input connected to the output of the second real delay unit $330_1$, and so on, until an active real filter coefficient unit located at the N-2 real filter coefficient unit position $310_{N-2}$ has an input connected to the output of an N-2 real delay unit $330_{N-2}$ and to the input of an N-1 real delay unit $330_{N-1}$. Finally, an active real filter coefficient unit located at the N-1 real filter coefficient unit position $310_{N-1}$ has an input connected to the output of the N-1 real delay unit $330_{N-1}$. The outputs of each of the active real filter coefficient units are summed at a combiner 320. The combiner 320 applies a real combined compensation signal to the real compensated signal output 260 of the digital time domain compensation module 210, based on the contribution of all of the active filter real coefficient units.

Furthermore, as shown in FIG. 3, a plurality of successively connected imaginary delay units $335_0, 335_1, \ldots, 335_{N-2}, 335_{N-1}$, are connected in series along the imaginary signal path of the digital time domain compensation module 210 to apply respective delays to a plurality of imaginary filter coefficient unit positions (i.e., tabs) $315_0, 315_1, 315_2, \ldots, 315_{N-2}, 315_{N-1}$. For example, a first active imaginary filter coefficient unit located at the imaginary filter coefficient unit position $315_0$ has an input connected to the input of a first imaginary delay unit $335_0$. A second imaginary filter coefficient unit position $315_1$ is located between the output of the first imaginary delay unit $335_0$ and the input of a second imaginary delay unit $335_1$. As shown in FIG. 3, an imaginary filter coefficient unit is not active (i.e., it is passive) at the second imaginary filter coefficient unit position $315_1$. Thus, the second imaginary filter coefficient unit position $315_1$ does not contribute to the compensation characteristics of the time domain compensation module 210 (i.e., its output is zero).

A second active imaginary filter coefficient unit located at the third imaginary filter coefficient unit position $315_2$ has an input connected to the output of the second imaginary delay unit $335_1$, and so on, until an active imaginary filter coefficient unit located at the N-2 imaginary filter coefficient unit position $315_{N-2}$ has an input connected to the output of an N-2 imaginary delay unit $335_{N-2}$ and to the input of an N-1 imaginary delay unit $335_{N-1}$. Finally, an active imaginary filter coefficient unit located at the N-1 imaginary filter coefficient unit position $315_{N-1}$ has an input connected to the output of the N-1 imaginary delay unit $335_{N-1}$. The outputs of each of the active imaginary filter coefficient units are summed at a combiner 320. The combiner 320 applies an imaginary combined compensation signal to the imaginary compensated signal output 270 of the digital time domain compensation module 210, based on the contributions of all of the active imaginary coefficient units.

The performance of the digital time domain compensation module 210 is based on the number of active filter coefficient units and by the design of the filter coefficients associated with each unit of the digital filter therein. The more active filter coefficient units that are incorporated into the digital time domain compensation module 210, the more the digital time domain compensation module 210 will converge toward ideal characteristics. On the other hand, the more active filter coefficient units the digital time domain compensation module 210 has, the more complex the system will be, resulting in more delay in the processing of real and imaginary signal components.

The performance of the digital time domain compensation module 210 will also rely on the configuration of the real and imaginary active filter coefficient units. The closer that the performance of the digital time domain compensation module 210 approaches the inverse of the frequency domain of the real and imaginary signal components 175, 180, output by the analog LPFs 165, 170, the more efficiently the signal degradation on the real and imaginary signal paths will be suppressed. Since the number of active coefficient units is less than the total number of coefficient unit positions (i.e., the entire length of the filter), the cost and complexity of the configuration used in the digital time domain compensation module 210 may be less complex and thus it may be constructed at a lower cost.

The present invention allows the design of the digital time domain compensation module 210 to be less complex by taking into the account that the main selectivity filter in the DBB RF receiver 200 will perform an interpolation function. Thus, the spectral shape of the real and imaginary signal components may be restored using a minimum number of active filter coefficient units.

It should be understood that the compensation of the real and imaginary signal components may be implemented by the digital time domain compensation module 210 at a sample rate substantially higher than the chip rate (e.g., ten times the chip rate).

While this invention has been particularly shown and described with reference to preferred embodiments, it will be understood by those skilled in the art that various changes in form and details may be made therein without departing from the scope of the invention described hereinabove.

What is claimed is:

1. A digital baseband (DBB) receiver for receiving and processing a wireless communication signal, the DBB receiver comprising:
   a) a demodulator which outputs analog real and imaginary signal components in response to receiving the communication signal;
   b) a first analog low pass filter (LPF) which receives the analog real signal component from the demodulator and outputs a distorted analog real signal component;
   c) a second analog LPF which receives the analog imaginary signal component from the demodulator and outputs a distorted analog imaginary signal component;
   d) a first digital gain control circuit which receives the distorted analog real signal component from the first analog LPF and outputs a processed distorted digital real signal component;
   e) a second digital gain control circuit which receives the distorted analog imaginary signal component from the second analog LPF and outputs a processed distorted digital imaginary signal component; and
   f) a digital time domain compensation module which receives the processed distorted digital real and imaginary signal components and outputs digital real and imaginary compensated signal components, wherein the digital time domain compensation module removes group delay variation distortion, introduced by the first and second analog LPFs, from the real and imaginary signal components.

2. The DBB receiver of claim 1 wherein the digital time domain compensation module comprises:
   i) a real signal path;
   ii) a plurality of real signal component delay units connected in series along the real signal path;
   iii) a plurality of real filter coefficient positions;
   iv) a first combiner having a plurality of inputs; and
   v) a plurality of active real filter coefficient units located at a subset of the real filter coefficient positions, wherein each of the active real filter coefficient units has an input connected to the real signal path and an output connected to one of the inputs of the first combiner, and the first combiner outputs the real compensated signal component.

3. The DBB receiver of claim 2 wherein the digital time domain compensation module further comprises:
   vi) an imaginary signal path;
   vii) a plurality of imaginary signal component delay units connected in series along the imaginary signal path;
   viii) a plurality of imaginary filter coefficient positions;
   ix) a second combiner having a plurality of inputs; and
   x) a plurality of active imaginary filter coefficient units located at a subset of the imaginary filter coefficient positions, wherein each of the active imaginary filter coefficient units has an input connected to the imaginary signal path and an output connected to one of the inputs of the second combiner, and the second combiner outputs the imaginary compensated signal component.

4. The DBB receiver of claim 1 wherein the digital time domain compensation module includes a plurality of real filter coefficient unit positions and a plurality of imaginary filter coefficient unit positions, wherein a plurality of active real filter coefficient units are present at a subset of the real filter coefficient unit positions and a plurality of active imaginary filter coefficient units are present at a subset of the imaginary filter coefficient unit positions.

5. The DBB receiver of claim 4 wherein the digital time domain compensation module further includes a plurality of real signal component delay units and a plurality of imaginary signal component delay units having inputs and outputs connected to the inputs of respective ones of the active filter coefficient units.

6. The DBB receiver of claim 1 wherein the digital time domain compensation module is a finite impulse response (FIR) filter having characteristics which are selected such that the frequency domain response of the digital time domain compensation module is the inverse of the frequency domain response of the analog LPFs.

7. The DBB receiver of claim 1 wherein the first digital gain control circuit comprises:
   i) a logarithmic amplifier for compressing the distorted analog real signal component from a wider dynamic range to a lower dynamic range;
   ii) an analog to digital converter (ADC) for converting the compressed distorted analog real signal component to a compressed distorted digital real signal component; and
   iii) a look up table (LUT) which provides an anti-log function used to decompress the compressed distorted digital real signal component.

8. The DBB receiver of claim 1 wherein the second digital gain control circuit comprises:
   i) a logarithmic amplifier for compressing the distorted analog imaginary signal component from a wider dynamic range to a lower dynamic range;
   ii) an analog to digital converter (ADC) for converting the compressed distorted analog imaginary signal component to a compressed distorted digital imaginary signal component; and
   iii) a look up table (LUT) which provides an anti-log function used to decompress the compressed distorted digital imaginary signal component.

9. A wireless transmit/receive unit (WTRU) for receiving and processing a wireless communication signal, the WTRU comprising:
   a) a demodulator which outputs analog real and imaginary signal components in response to receiving the communication signal;
   b) a first analog low pass filter (LPF) which receives the analog real signal component from the demodulator and outputs a distorted analog real signal component;
   c) a second analog LPF which receives the analog imaginary signal component from the demodulator and outputs a distorted analog imaginary signal component;
   d) a first digital gain control circuit which receives the distorted analog real signal component from the first analog LPF and outputs a processed distorted digital real signal component;

e) a second digital gain control circuit which receives the distorted analog imaginary signal component from the second analog LPF and outputs a processed distorted digital imaginary signal component; and f) a digital time domain compensation module which receives the processed distorted digital real and imaginary signal components and outputs digital real and imaginary compensated signal components, wherein the digital time domain compensation module removes group delay variation distortion, introduced by the first and second analog LPFs, from the real and imaginary signal components.

10. The WTRU of claim 9 wherein the digital time domain compensation module comprises:

i) a real signal path;
ii) a plurality of real signal component delay units connected in series along the real signal path;
iii) a plurality of real filter coefficient positions;
iv) a first combiner having a plurality of inputs; and
v) a plurality of active real filter coefficient units located at a subset of the real filter coefficient positions, wherein each of the active real filter coefficient units has an input connected to the real signal path and an output connected to one of the inputs of the first combiner, and the first combiner outputs the real compensated signal component.

11. The WTRU of claim 10 wherein the digital time domain compensation module further comprises:

vi) an imaginary signal path;
vii) a plurality of imaginary signal component delay units connected in series along the imaginary signal path;
viii) a plurality of imaginary filter coefficient positions;
ix) a second combiner having a plurality of inputs; and
x) a plurality of active imaginary filter coefficient units located at a subset of the imaginary filter coefficient positions, wherein each of the active imaginary filter coefficient units has an input connected to the imaginary signal path and an output connected to one of the inputs of the second combiner, and the second combiner outputs the imaginary compensated signal component.

12. The WTRU of claim 9 wherein the digital time domain compensation module includes a plurality of real filter coefficient unit positions and a plurality of imaginary filter coefficient unit positions, wherein a plurality of active real filter coefficient units are present at a subset of the real filter coefficient unit positions and a plurality of active imaginary filter coefficient units are present at a subset of the imaginary filter coefficient unit positions.

13. The WTRU of claim 12 wherein the digital time domain compensation module further includes a plurality of real signal component delay units and a plurality of imaginary signal component delay units having inputs and outputs connected to the inputs of respective ones of the active filter coefficient units.

14. The WTRU of claim 9 wherein the digital time domain compensation module is a finite impulse response (FIR) filter having characteristics which are selected such that the frequency domain response of the digital time domain compensation module is the inverse of the frequency domain response of the analog LPFs.

15. The WTRU of claim 9 wherein the first digital gain control circuit comprises:

i) a logarithmic amplifier for compressing the distorted analog real signal component from a wider dynamic range to a lower dynamic range;

ii) an analog to digital converter (ADC) for converting the compressed distorted analog real signal component to a compressed distorted digital real signal component; and iii) a look up table (LUT) which provides an anti-log function used to decompress the compressed distorted digital real signal component.

16. The WTRU of claim 9 wherein the second digital gain control circuit comprises:

i) a logarithmic amplifier for compressing the distorted analog imaginary signal component from a wider dynamic range to a lower dynamic range;

ii) an analog to digital converter (ADC) for converting the compressed distorted analog imaginary signal component to a compressed distorted digital imaginary signal component; and iii) a look up table (LUT) which provides an anti-log function used to decompress the compressed distorted digital imaginary signal component.

17. An integrated circuit (IC) for receiving and processing a wireless communication signal, the IC comprising:

a) a demodulator which outputs analog real and imaginary signal components in response to receiving the communication signal;

b) a first analog low pass filter (LPF) which receives the analog real signal component from the demodulator and outputs a distorted analog real signal component;

c) a second analog LPF which receives the analog imaginary signal component from the demodulator and outputs a distorted analog imaginary signal component;

d) a first digital gain control circuit which receives the distorted analog real signal component from the first analog LPF and outputs a processed distorted digital real signal component;

e) a second digital gain control circuit which receives the distorted analog imaginary signal component from the second analog LPF and outputs a processed distorted digital imaginary signal component; and f) a digital time domain compensation module which receives the processed distorted digital real and imaginary signal components and outputs digital real and imaginary compensated signal components, wherein the digital time domain compensation module removes group delay variation distortion, introduced by the first and second analog LPFs, from the real and imaginary signal components.

18. The IC of claim 17 wherein the digital time domain compensation module comprises:

i) a real signal path;
ii) a plurality of real signal component delay units connected in series along the real signal path;
iii) a plurality of real filter coefficient positions;
iv) a first combiner having a plurality of inputs; and
v) a plurality of active real filter coefficient units located at a subset of the real filter coefficient positions, wherein each of the active real filter coefficient units has an input connected to the real signal path and an output connected to one of the inputs of the first combiner, and the first combiner outputs the real compensated signal component.

19. The IC of claim 18 wherein the digital time domain compensation module further comprises:

vi) an imaginary signal path;
vii) a plurality of imaginary signal component delay units connected in series along the imaginary signal path;
viii) a plurality of imaginary filter coefficient positions;
ix) a second combiner having a plurality of inputs; and x) a plurality of active imaginary filter coefficient units located at a subset of the imaginary filter coefficient positions, wherein each of the active imaginary filter coefficient units has an input connected to the imaginary signal path and an output connected to one of the inputs of the second combiner, and the second combiner outputs the imaginary compensated signal component.

20. The IC of claim 17 wherein the digital time domain compensation module includes a plurality of real filter coefficient unit positions and a plurality of imaginary filter coefficient unit positions, wherein a plurality of active real filter coefficient units are present at a subset of the real filter coefficient unit positions and a plurality of active imaginary filter coefficient units are present at a subset of the imaginary filter coefficient unit positions.

21. The IC of claim 20 wherein the digital time domain compensation module further includes a plurality of real signal component delay units and a plurality of imaginary signal component delay units having inputs and outputs connected to the inputs of respective ones of the active filter coefficient units.

22. The IC of claim 17 wherein the digital time domain compensation module is a finite impulse response (FIR) filter having characteristics which are selected such that the frequency domain response of the digital time domain compensation module is the inverse of the frequency domain response of the analog LPFs.

23. The IC of claim 17 wherein the first digital gain control circuit comprises:

i) a logarithmic amplifier for compressing the distorted analog real signal component from a wider dynamic range to a lower dynamic range;

ii) an analog to digital converter (ADC) for converting the compressed distorted analog real signal component to a compressed distorted digital real signal component; and iii) a look up table (LUT) which provides an anti-log function used to decompress the compressed distorted digital real signal component.

24. The IC of claim 17 wherein the second digital gain control circuit comprises:

i) a logarithmic amplifier for compressing the distorted analog imaginary signal component from a wider dynamic range to a lower dynamic range;

ii) an analog to digital converter (ADC) for converting the compressed distorted analog imaginary signal component to a compressed distorted digital imaginary signal component; and iii) a look up table (LUT) which provides an anti-log function used to decompress the compressed distorted digital imaginary signal component.

* * * * *

UNITED STATES PATENT AND TRADEMARK OFFICE
CERTIFICATE OF CORRECTION

PATENT NO.        : 7,248,649 B2
APPLICATION NO.   : 10/749634
DATED             : July 24, 2007
INVENTOR(S)       : Demir et al.

Page 1 of 1

It is certified that error appears in the above-identified patent and that said Letters Patent is hereby corrected as shown below:

At column 2, line 19, after "DBB", delete "transmitter" and insert therefor --receiver--.

At column 3, line 4, before the word "second", delete "Thee" and insert therefor --The--.

At column 3, line 7, before the words "a plurality", delete "includes" and insert therefor --include--.

At column 3, line 49, after the word "preferred", delete "example" and insert therefor --embodiment--.

At column 3, line 51, before the word "wherein", delete "drawing" and insert therefor --drawings--.

At column 7, line 1, before the word "account", delete "the".

Signed and Sealed this

Eleventh Day of December, 2007

JON W. DUDAS
*Director of the United States Patent and Trademark Office*